Dec. 20, 1966  C. B. SHAW  3,292,352
ADJUSTABLE MEANS FOR COTTON PICKER DOFFER
Filed Aug. 18, 1964

INVENTOR
CLARENCE BATTLE SHAW

BY
ATTORNEY

United States Patent Office 3,292,352
Patented Dec. 20, 1966

3,292,352
ADJUSTABLE MEANS FOR COTTON PICKER DOFFER
Clarence Battle Shaw, 505 N. Washington St., Brownsville, Tenn. 38012
Filed Aug. 18, 1964, Ser. No. 390,311
1 Claim. (Cl. 56—41)

This invention relates to a cotton harvester or picker of the type shown and described in United States Patent No. 2,140,631, issued to Edward A. Johnston on December 20, 1938, and the instant invention relates particularly to the novel mounting for the doffer means of said machine.

The structure shown in the Johnston Patent 2,140,631 is typical of present day cotton harvesters which use a plurality of cotton picker elements in the form of revolving barbed spindles which move in a path and are projected into a row of cotton plants where the cotton winds around the revolving barbed spindles.

The spindles with the cotton wound thereon are then led out of the path of the cotton plants to a doffer station where means are provided to remove or strip the cotton from the spindles. This machine construction is on both sides of a row of cotton plants.

The doffer means for stripping the picked cotton from the spindles comprises a series of vertically spaced doffer assemblies carried on a vertically driven shaft, each of said doffer assemblies being in the form of a disk with several doffer members or pads mounted thereunder and positioned so that said doffer pads sweep over the horizontal row of spindles which are projected into the doffer path.

Generally, the pads on the disk assembly are formed of rubber or the like and in use they are gradually worn away so that periodic adjustment is required for the proper function of the mechanism, that is, the correct contact of the doffer pad with the spindle having cotton wound thereon.

The specific invention here relates to means for horizontally adjusting the doffer shaft on which the several doffer disks are mounted by moving the bottom bearing of the doffer shaft so that the same with the doffers thereon is moved into the path of the revolving spindles and then said shaft can be secured in such position.

It has been found that if the doffer shaft gets out of alignment and does not properly contact the barbed spindles, the cotton on the spindles will become clogged thereon and will not be wiped from the spindles by the doffers.

It has also been found that if the lower cage assembly, having thereon the bearing for the lower end of the doffer shaft, is moved from a vertical position while keeping the upper end of the shaft in its original fixed position, the spindles with cotton collected thereon will meet the surface of the doffer pads at the correct angle and the cotton thereon will be wiped therefrom.

The angle in which the doffer pads and the spindles contact is found to be critical and determines whether the cotton on the spindles will proceed from the point of the spindle backward and become foul on the spindle or proceed from the back of the spindle to a forward position at the point of the spindle and be wiped therefrom.

This and other objects and advantages which will become subsequently apparent reside in the details of construction and operation, as more fully hereinafter described and claimed, reference being had to the accompanying drawings forming a part hereof, wherein like numerals refer to like parts throughout and in which:

Figure 1:
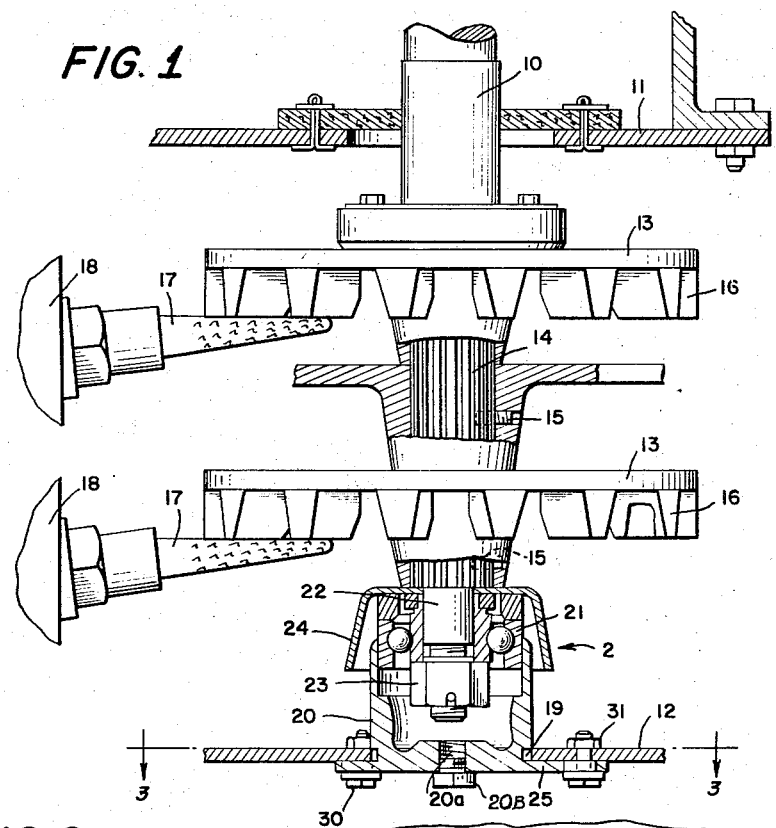
FIG. 1 is a fragmentary side elevational view of a doffer mechanism.
Figure 2:
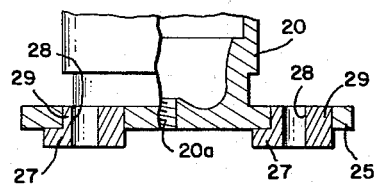
FIG. 2 is a sectional view on line 2—2 of FIG. 4 showing the bearing receiving cavity member of the doffer shaft which forms the subject matter of this invention.
Figure 3:
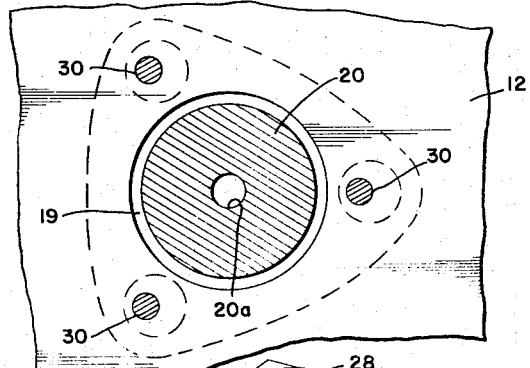
FIG. 3 is a top plan view on line 3—3 of FIG. 1.
Figure 4:
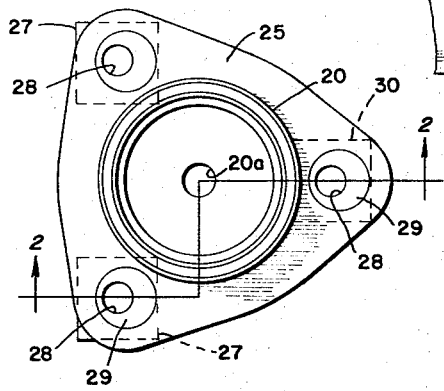
FIG. 4 is a top plan view of FIG. 2.

The doffer arrangement shown in the drawings of this case is the lower portion of the drawings forming part of Patent 2,140,631 to Johnston and only so much of the drawings here will be described as is necessary to give a proper background for the invention claimed.

In the drawings, 10 is a doffer shaft shown in section, which projects above the upper housing structure 11 where, on its upper end, it is driven by the mechanism shown in the Johnston patent. The housing structure 11 has a complementary lower housing structure 12.

The doffer shaft 10 has mounted thereon a series of vertically spaced doffer disks 13, only two of which are shown in the drawings. These doffer disks 13 are mounted on the doffer shaft 10 through a spline arrangement 14 and are held in fixed position thereon by set screws 15.

Under each of the doffer disks 13 are a series of individual rubber pads 16, the doffer disks 13 being positioned on the doffer shaft 10 so that the rubber pads 16 contact the revolving spindles 17 having cotton wound thereon as the spindles are projected by their carrying mechanism 18 under the rubber pads 16.

The lower housing structure 12 has a circular cut-out 19 removed therefrom in which the lower bearing cavity member 20 for the doffer shaft 10 is positioned and fixed.

The upper portion of the lower bearing cavity member 20 receives the roller bearing 21, the inner race of which surrounds the lower tip 22 of the doffer shaft 10. The roller bearing 21 is held in place on the tip 22 of the doffer shaft 10 by a nut 23 and between the contact surfaces of the doffer shaft 10 and the roller bearing 21 there is interposed a dust cap 24.

The lower portion of the lower bearing cavity member 20 has a flange 25 which extends outwardly around and forms an enlargement on its bottom. The bottom of the lower housing structure 12 is supported on the top of the flange 25. In the bottom of the lower bearing cavity member 20 is a grease opening 20$^a$ to oil the roller bearing 21, the same being closed by a threaded screw plug 20$^b$.

Figure 5:
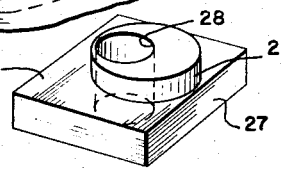
FIG. 5 is an eccentric blank showing in all of the figures and being used to shift the position of the bearing receiving cavity member of the doffer shaft.

Eccentric inserts 26, shown clearly in FIG. 5, are used to position the lower bearing cavity member 20 in the cut-out 19 of the lower housing structure 12. These eccentric inserts 26 are square blocks of metal 26 having openings 28 therethrough and eccentric extensions 29 on the upper face in relation to the openings 28 therethrough.

The eccentric inserts 26 when in use are held in place by headed bolts 30 which project through openings in the flange 25 of the lower bearing cavity member 20 and extend through openings in the lower housing structure 13, the bolts having nuts 31 threaded thereon.

By changing the position in which the vertical walls 29 of the eccentric inserts 26 come in contact with the outside edge of the flange 25, the position of the lower bearing cavity member 20 is governed. This position becomes permanent when the nuts 31 are screwed down on the bolts 30.

What is claimed is:

In a cotton harvester, the combination of revolving picking spindles, a substantially vertically mounted doffer shaft having doffer disks spaced vertically apart thereon, an upper bearing for the doffer shaft mounted on a housing in said harvester and a lower bearing for the same mounted in a cup-shaped cavity member, said cup-shaped cavity member having openings therein removed from the lower bearing, said cup-shaped cavity member being movably mounted in a cut-out in the bottom of said machine housing with means for moving the position of the cavity member and bearing thereon so that the doffers contact the picking spindle at the proper point for the removal of cotton from said spindle, said means for moving the position of the cavity member and the bearing thereon being eccentric face blocks having openings therethrough, the faces of the eccentric blocks extending through said openings in said cup-shaped cavity member with means to retain said eccentric blocks in their fixed position by retaining members extending through the machine housing.

References Cited by the Examiner

UNITED STATES PATENTS

| | | | |
|---|---|---|---|
| 313,278 | 3/1885 | Beekman | 56—40 |
| 943,266 | 12/1909 | Pelton. | |
| 1,828,534 | 10/1931 | Johnston et al. | 56—44 |
| 2,140,631 | 12/1138 | Johnston | 56—41 |
| 2,692,469 | 10/1954 | Smith | 56—47 |
| 2,722,294 | 11/1955 | Lagaard | 85—1 X |
| 3,008,368 | 11/1961 | Hammit et al. | 85—50 X |
| 3,224,178 | 12/1965 | Kennedy | 56—41 |

ABRAHAM G. STONE, *Primary Examiner.*

RUSSELL R. KINSEY, M. C. PAYDEN,

*Assistant Examiners.*